Sept. 20, 1966 C. D. HALVERSTADT 3,273,248

HIGH PRECISION CALIPER GAGE

Filed Sept. 14, 1964 5 Sheets-Sheet 1

INVENTOR.
CARL D. HALVERSTADT
BY
Willard S. Grone
ATTORNEY

Sept. 20, 1966 C. D. HALVERSTADT 3,273,248

HIGH PRECISION CALIPER GAGE

Filed Sept. 14, 1964 5 Sheets-Sheet 2

INVENTOR.
CARL D. HALVERSTADT
BY
Willard L. Groene
ATTORNEY

HIGH PRECISION CALIPER GAGE

Filed Sept. 14, 1964 5 Sheets-Sheet 3

INVENTOR.
CARL D. HALVERSTADT
BY
Willard S. Grover
ATTORNEY

HIGH PRECISION CALIPER GAGE

Filed Sept. 14, 1964 5 Sheets-Sheet 4

INVENTOR.
CARL D. HALVERSTADT
BY
Willard L. Groene
ATTORNEY

HIGH PRECISION CALIPER GAGE

INVENTOR.
CARL D. HALVERSTADT
BY
Willard S. Grover
ATTORNEY

United States Patent Office 3,273,248

Patented Sept. 20, 1966

3,273,248

HIGH PRECISION CALIPER GAGE

Carl D. Halverstadt, Corona, Calif., assignor of fifty percent to Arthur L. Rothfeder, Scottsdale, Ariz.

Filed Sept. 14, 1964, Ser. No. 396,433
4 Claims. (Cl. 33—147)

This invention pertains to measuring and gaging devices and is particularly directed to a high precision caliper gage.

One of the objects of this invention is to provide a high precision caliper gage adapted to the transfer of measurement by comparison from one object to another in high degrees of dimensional difference detectability with the use of optics and/or a sensing element with a degree of amplification.

Another object is to provide a high precision caliper gage having a high degree of resistance to environmental change by component arrangement and handling elements being covered with plastic or other heat insulating materials.

It is also an object to provide a high precision caliper gage having an optical vernier readout with reset capabilities to forty millionths of an inch.

Still another object is to provide a high precision caliper gage having a variable gage load which would insure accurate measurement of fragile articles without causing excessive deformation at the section of measurement.

A further object is to provide a high precision caliper gage having jaws with surfaces specially arranged to receive attachable elements for internal as well as special measurements.

Another object is to provide the above described caliper gage with a lever lock system which is instantly releasable with light manual pressure but positive enough to provide an element that does not move millionths of an inch as it is being used.

Still another object is to provide the above caliper gage with a micro-adjustment between the lever lock and the dial gage or other sensing element mount to provide ease in setting with an arrangement which eliminates backlash.

It is a further object to provide a slidable optical scale with adjustment means that eliminates backlash.

Another object is to provide in the above caliper gage a loading of the dial gage or sensing element carriage by a spring so as to provide a rigid movable mount.

Still another object is to provide in the gage above a variable applicable gage load for fragile articles, so arranged as to provide directional load changebility so that outside dimensional as well as inside dimensional loads may be applied for gaging.

It is also an object to provide in the aforementioned gage a travel adjust screw which will allow adjustable travel in both directions as well as zero travel screw provided with a side load pellet to provide positive thread engagement insuring position stability.

An optical system for the gage is provided with a vernier reticle in the optical plane with adequate magnification to provide ease in reading setting to .0001" with unquestionable dependability.

A further object is to provide optical illumination in the gage by the use of a fluorescent plastic so located as to provide efficient light reflectance back through the optics from normal room light.

Still another object is to provide the slidable jaw for the gage with a low coefficient of friction and two initial faces of contact at the greatest possible distance apart held against a precision reference surface with a plurality of screws and with low coefficient of friction plastic coated gibs so as to assure maintenance of jaw parallelism to millionths of an inch for many cycles of actuation.

Further features and advantages of this invention will appear from a detailed description of the drawings in which:

FIG. 1 is an elevation of one side of the caliper gage incorporating the features of this invention;

FIG. 1*a* is an enlarged fragmentary sectional view on the line 1*a*—1*a* of FIG. 1;

FIG. 1*b* is an enlarged fragmentary sectional view on the line 1*b*—1*b* of FIG. 1.

FIG. 1*c* is an enlarged fragmentary sectional view on the line 1*c*—1*c* of FIG. 1.

FIG. 2 is a plan view of the caliper gage shown in FIG. 1;

FIG. 2*a* is an enlarged fragmentary sectional view on the line 2*a*—2*a* of FIG. 2.

Figures 15, 16, 17, 18, 19, 20, 20A:
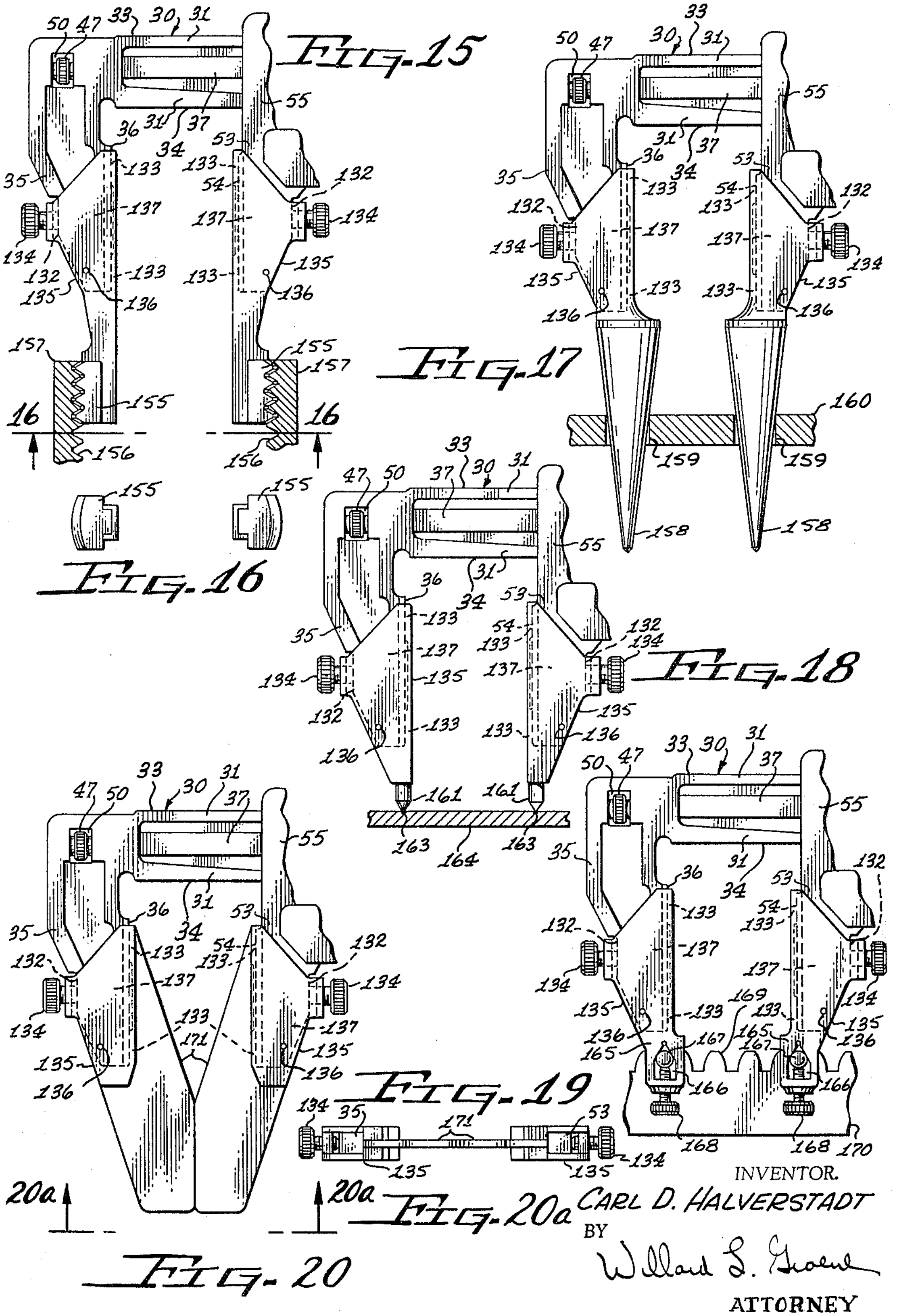
FIG. 15 is a view showing inside thread root diameter measuring adaptors applied to the gage jaws.
FIG. 16 is an enlarged view on the line 16—16 of FIG. 15.
FIG. 17 is a view showing hole-to-hole distance measuring adaptors applied to the gage jaws.
FIG. 18 is a view showing precision center punch mark checking adaptors applied to the gage jaws.
FIG. 19 is a view showing precision gear rack tooth spacing checking adaptors applied to the gage jaws.
FIG. 20 is a view showing recess measurement adaptors applied to the gage jaws.

FIG. 20*a* is a view on the line **20*a*—20*a*** of FIG. 20.

Figures 21, 22, 23, 24, 25, 26:
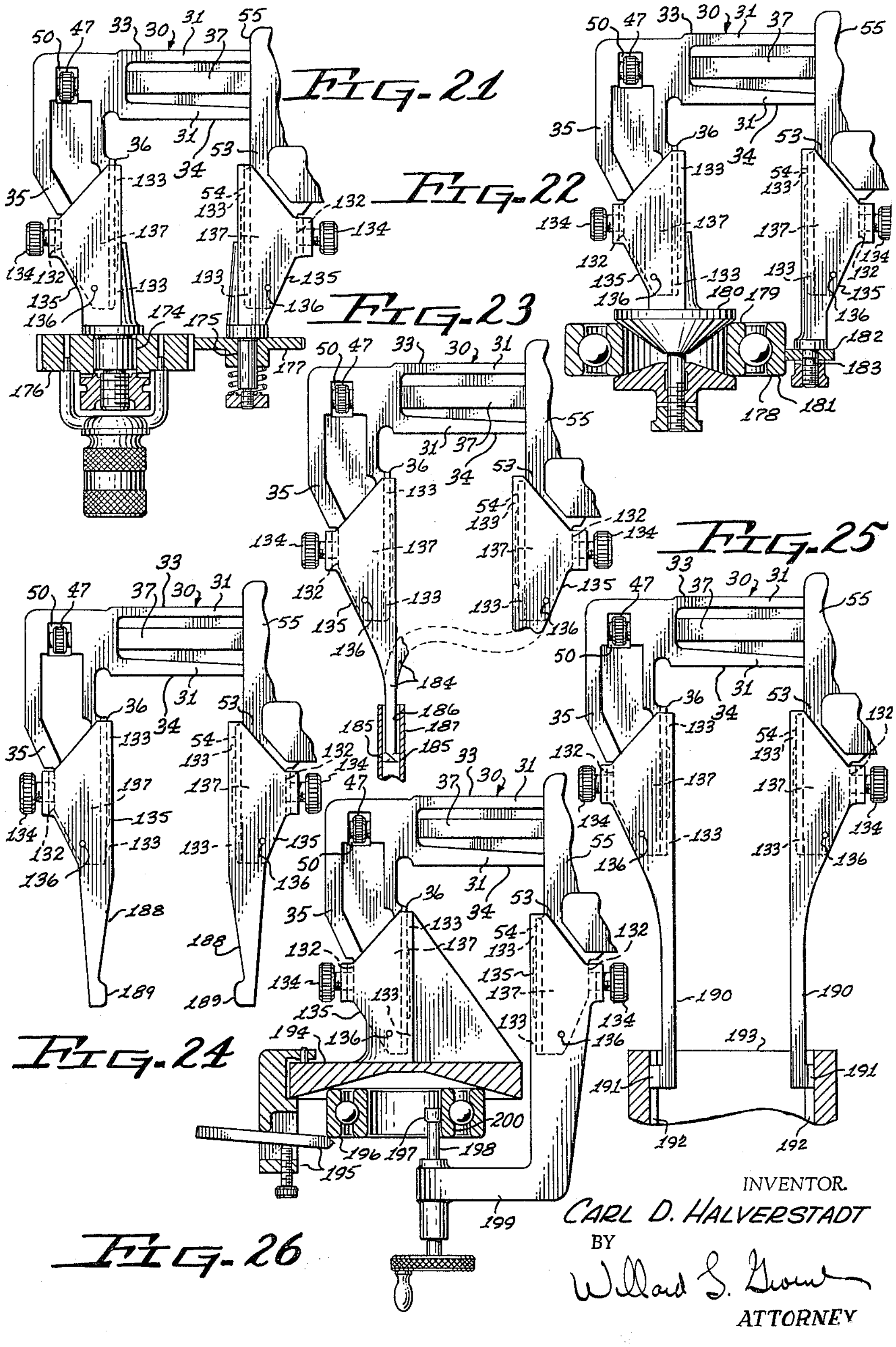

FIG. 21 is a view showing spur gear pitch diameter checking adaptors applied to the gage jaws.

FIG. 22 is a view showing ball bearing outer race testing adaptors applied to the gage jaws.

FIG. 23 is a view showing small bore measuring adaptors applied to the gage jaws.

FIG. 24 is a view showing large outside diameter measuring adaptors applied to the gage jaws.

FIG. 25 is a view showing internal tooth gearing and spline checking adaptors applied to the gage jaws.

FIG. 26 is a view showing ball bearing inner race runout test adaptors applied to the gage jaws.

As an example of one embodiment of this invention, there is shown a high precision caliper gage comprising a body 30 having the precisely parallel side rail surfaces 31 and 32, and the edge rail surfaces 33 and 34 including an integral body jaw 35 having a work contacting surface 36, preferably formed of hardened material and precisely lapped to a flat surface defining a plane precisely at right angles to the planes defined by the side rail surfaces 31 and 32 and the edge rail surfaces 33 and 34.

Longitudinally slidably mounted on one side of the body 30 is an optical scale 37 supported along its edges 38 in a suitable slot 39 formed in the body 30. The outer end, away from the body jaw 35, is slidably guided and held in operative position by a retainer plate 40 to the body 30 by suitable screws 41. The inner end of the optical scale 37 is slidingly guided in a suitable opening 42 which communicates between the slot 39 and a cavity 43 formed in the body 30 adjacent the body jaw 35. Within the cavity 43 is carried a block 44 suitably fixed to the end of the optical scale 37. Fixed at its inner end to the block 44 is an adjusting screw 46 upon which is threadedly mounted a knurled nut 47 on one side of which is mounted suitable shim spacer washers 48 which abut against the wall 49 of a slot 50 formed in the end of the body 30 while on the other side of the knurled nut 47 there is provided a spring washer 51 engaging the other wall 52 of the slot 50. By manually rotating the knurled nut 47 the optical scale may be precisely moved longitudinally relative to the body 30 and its work contacting surface 36.

A movable jaw 53 has a hardened work contacting surface 54 lying in a plane parallel to the work contacting surface 36 of the body jaw. The movable jaw 53 has an integral rectangular shank portion 55 surrounding the body 30 including sliding guide surfaces 56 and 57 which abut against or slide along body edge rail surface 34. A suitable low friction plastic gib 58 slidingly engages the body edge rail surface 33 and is appropriately adjusted relative thereto by the set screws 59, while surfaces 60 slidingly engage the body side rail surfaces 32, the gib screws 61 being adjusted to appropriately engage the body side rail surfaces 31, so as to maintain parallelism of the jaw surfaces 36 and 54 for any position of the movable jaw 53 along the body 30. A suitable movable jaw control thumb pad 62 is fixed to the shank 55 opposite the jaw 53 to facilitate sliding the movable jaw 53 along the body 30.

Figures 1, 1A, 1B, 2, 2A, 3:
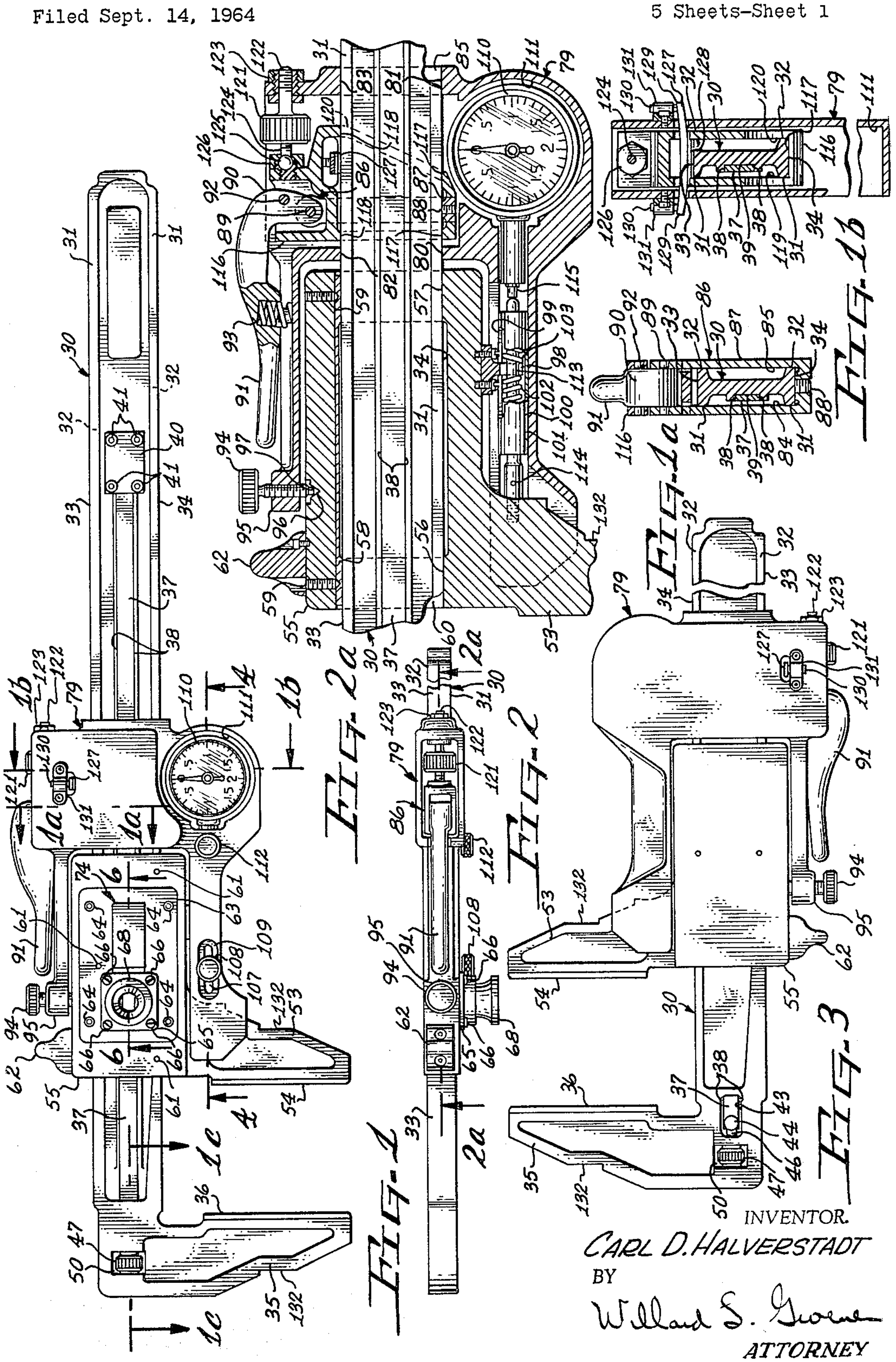
FIG. 3 is a side view of the gage opposite from that shown in FIG. 1.
Figure 4:
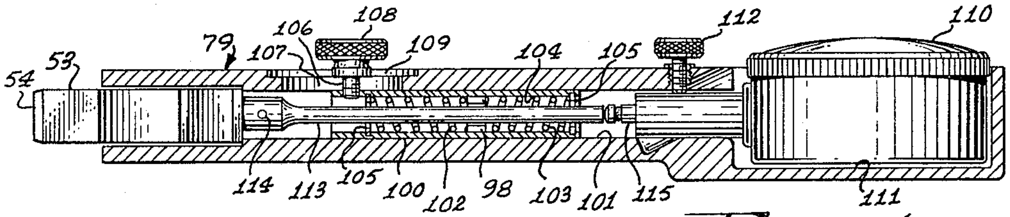
FIG. 4 is an enlarged fragmentary sectional view on the line 4—4 of FIG. 1.
Figure 5:
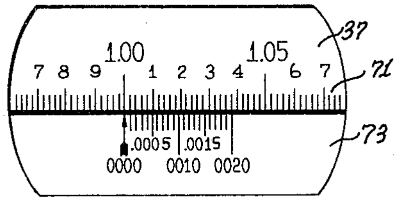
FIG. 5 is a view of the main scale and vernier as seen through the 21 power optical eyepiece.
Figure 1C:
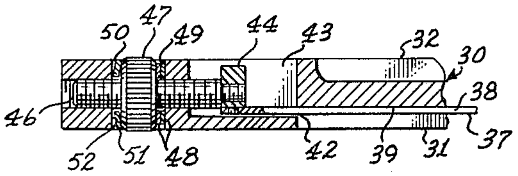
Figure 6:
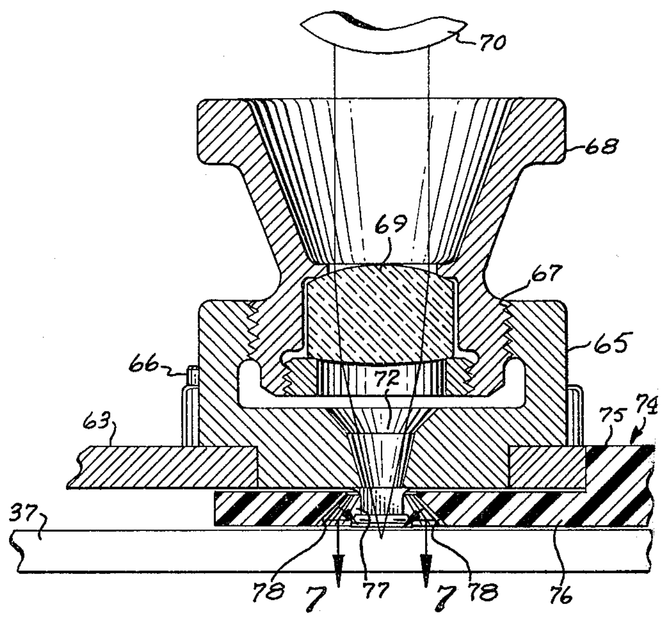
FIG. 6 is an enlarged sectional view on the line 6—6 of FIG. 1.
Figure 7:
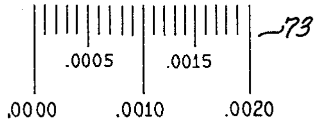
FIG. 7 is an enlarged view of one form of vernier graduations shown in FIG. 5.
Figure 8:
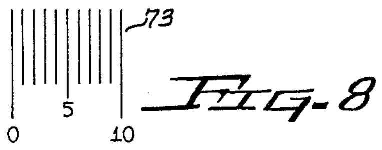
FIG. 8 is an enlarged view of another form of vernier graduations.

An optical mounting plate 63 is suitably fixed to the movable jaw shank 55 by screws 64. An eyepiece holder block 65 is fixed to the optical mounting plate by screws 66 and has a threaded bore 67 adapted to receive an appropriate microscopic eyepiece 68 having a lens 69 through which the eye 70 of the gage user may observe the graduations 71 through the aperture 72 formed in the eyepiece holder block 65. The optical vernier reticle 73 carried by the eyepiece may take the form of graduations shown in FIGS. 5, 7 and 8. In order to provide adequate illumination to the graduations 71 and 73 there is provided a plastic block 74 fixed to the optical mounting plate 63 having a light input receiving window 75 to which is integrally connected the light transmitting portion 76 having an aperture 77 through which the graduations are observed with the eyepiece 68, the aperture 77 having beveled sides 78 to provide a conical light emitting surface for uniform illumination of the graduations 71 and 73.

A dial indicator or sensing element carriage 79 is slidably mounted for longitudinal movement along the body 30 and has longitudinally spaced surfaces 80 and 81 adapted to slide on the edge rail surface 34 and surfaces 82 and 83 which slide on the edge rail surface 33 of the body 30. Side surfaces 84 and 85 slidingly engage the side rail surfaces 31 and 32 of the body 30.

A releasable clamp device 86 is provided for selectively positioning the dial indicator carriage 79 at desired positions along the body 30 comprising a U-shaped member 87 having an adjustable screw 88 adapted to engage the edge rail surface 34. The outer ends of the U-shaped clamp member 87 is pivotally connected by a pin 89 to the arm 90 of the carriage clamp release lever 91 which in turn is pivotally mounted on a pin 92 carried in a carriage lock member 116. A compression spring 93 yieldingly swings the carriage clamp release lever to outward locked or clamped position of the clamp 86 so that when the lever 91 is depressed the clamp 86 is released to allow sliding the dial indicator carriage 79 on the body 30. The carriage lock member 116 has guide surface 117 sliding on the edge rail surface 34 and guide surfaces 118 sliding on the edge rail surface 33 of the body 30, while side guide surfaces 119 and 120 slide on the side guide surfaces 31 and 32 of the body 30. A zero adjusting thumb screw 121 has a threaded stem 122 operating in a backlash free nut 123 fixed to the dial indicator carriage and adapted to receive and be fixed to a stem 124 having a ball end 125 journaled in a suitable backlash free ball socket 126 fixed to the carriage lock member 116 so that relative adjustment of the dial carriage and carriage lock member 116 may be obtained to provide ease in setting.

The relative longitudinal travel between the movable jaw 53 and the dial indicator carriage is determined by the travel adjusting screw 94 which is threadedly mounted in the outer end of the arm 95 formed integral with the dial indicator carriage 79. The outer end of the travel adjusting screw is formed with a conical point 96 which engages in a larger conical cavity 97 formed in the shank portion 55 of the movable jaw 53. When the travel adjusting screw 94 is adjusted down into the bottom of the conical cavity 97 the movable jaw and dial indicator carriage are rigidly locked together. When the screw 94 is retracted partly out of the cavity, limited longitudinal relative travel of the movable jaw 53 and the dial indicator carriage is provided.

A variable adjustable gage load is provided by yielding biased pressure in either direction for the relative movement of the movable jaw 53 and the dial indicator carriage 79. To this end there is provided a yoke spring jaw 98 which is rigidly fixed to the movable jaw shank portion 55 and extends through a slot 99 formed in the side intermediate the ends of a spring tube 100 slidably mounted in a bore 101 formed in the dial indicator carriage 79. Compression springs 102 and 103 are located within the spring tube bore 104, one each side of the yoke spring jaw 98, the springs being confined at each end of the spring tube 100 by suitable snap rings 105. Projecting radially outwardly from and fixed to the spring tube 100 is a threaded stud 106 which may be moved back and forth in the elongated slot 107 formed in the dial indicator carriage 79. A gaging load positioning thumb screw 108 is carried on the outer end of the stud 106 and operates in the enlarged portion 109 of the elongated slot 107. When the thumb nut 108 is loosened the spring tube 100 may be adjusted longitudinally in the bore 101 to bring one or the other of the springs 102 or 103 into engagement with varying degrees of pressure with the yoke spring jaw 98 and then tightening the thumb nut 108 secures the spring tube to the dial indicator carriage 79 in desired adjusted position.

A dial indicator 110 is mounted in a protective cavity 111 in the dial indicator carriage 79 and secured in the end of the bore 101 by a suitable clamp thumb screw 112. A dial indicator push rod 113 is suitably fixed to the movable jaw at 114 and extends coaxially through the tube 100, the springs 102 and 103 and the yoke 98 to engage the end of the actuating plunger 115.

Loading of the dial gage carriage 79 is provided by a flat spring 127 having its intermediate convex portion engaging a load transmitting saddle member 128 engaging the edge rail surface 33 of the body 30 while the outer ends 129 of the flat spring 127 are engaged by abutment screws 130 carried in blocks 131 fixed to the dial indicator carriage 79 so as to maintain the surfaces 80 and 81 in firm sliding movable contact with the edge rail surface 34.

The above described high precision caliper gage is particularly well adapted to a wide variety of gaging and measuring operations such as shown in FIGS. 9 through 26 inclusive. To this end each of the jaws 35 and 53 are provided with specially constructed surfaces 132 adapted to receive attachable elements for internal as well as special measurements. Each of the measuring finger attachments have shanks 135 having basic locating surfaces 133 which engage the surfaces 36 and 54 of the gage jaws. A clamp thumb screw 134 is adapted to be tightened against the surface 132 of the jaw to secure the surfaces 36–133 and 54–133 in firm accurate and aligned contact to hold the various attachment fingers in place on the jaws 35 and 53. Positioning set screws 136 in the shanks 135 engage the side faces 137 of the jaws 35 and 53 to accurately laterally position the shanks and their associated appendages on the gage jaws.

Figures 9, 10, 11, 12, 13, 14:
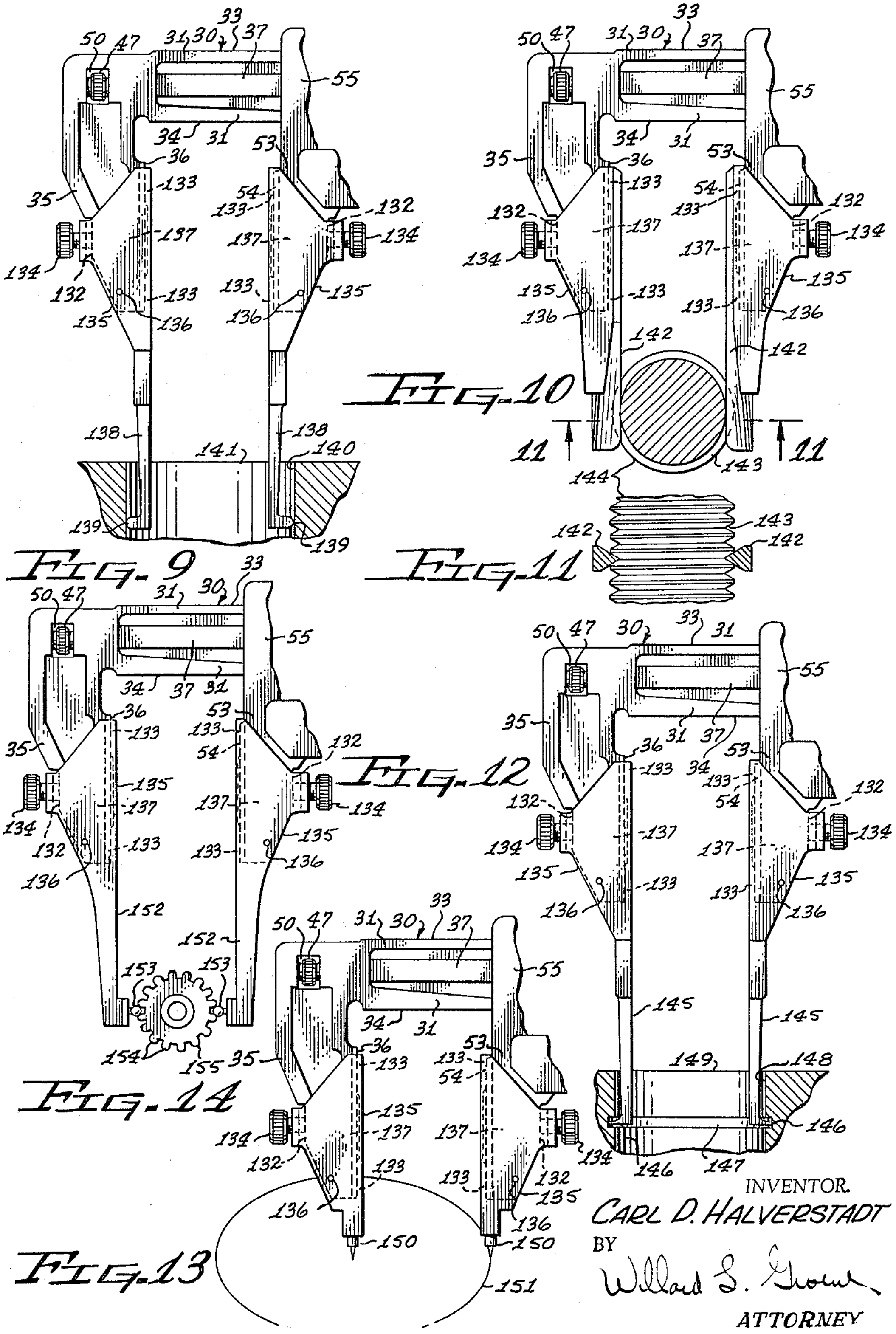
FIG. 9 is a view showing bore adaptors applied to the gage jaws.
FIG. 10 is a view showing thread root measuring adaptor applied to the gage jaws.
FIG. 11 is an enlarged sectional view on the line 11—11 of FIG. 10.
FIG. 12 is a view showing inside groove measuring adaptors applied to the gage jaws.
FIG. 13 is a view showing precision layout scribe adaptors applied to the gage jaws.
FIG. 14 is a view showing gear pitch measuring adaptors applied to the gage jaws.

FIG. 9 shows shanks 135 having finger extensions 138 having work contacting tips 139 for engaging and measuring the internal bore surface 140 of a workpiece 141.

FIGS. 10 and 11 show the shank 135 provided with facing V-shaped fingers 142 adapted to fit in the threads 143 of a threaded workpiece 144.

FIG. 12 shows the shanks 135 provided with finger extensions 145 having thin work contacting tips 146 for measuring the depth of an annular groove 147 in the bore 148 of a workpiece 149.

FIG. 13 shows the shanks 135 provided with scribing tips 150 for precision layout of scribed lines 151 on a workpiece surface.

FIG. 14 shows finger extensions 152 having ball tips 153 engaging between the gear teeth 154 of a workpiece 155 for gaging the gear pitch.

FIGS. 15 and 16 show the shanks 135 provided with arcuate tooth tips 155 particularly adapted to measure the root diameter of inside threads 156 of a workpiece 157.

FIG. 17 shows the shanks 135 provided with elongated conical tips 158 adapted to be inserted in holes 159 in a workpiece 160 to gage hole to hole distance.

FIG. 18 shows the shanks 135 provided with conically pointed pins 161 having short tips 161 adapted to engage center punch marks 163 for checking the spacing thereof on a workpiece 164.

FIG. 19 shows the shanks 135 provided with extensions 165 having slots 166 in which parallel work contacting pins 167 may be secured by thumb screws 168 for measuring the rack teeth 169 on a workpiece 170.

In FIGS. 20 and 20*a* is shown the shanks provided with knife edge blades 171 used to measure recesses in a workpiece.

In FIG. 21 is shown an arrangement wherein mandrels 174 and 175 are provided on the shanks 135 upon which gears 176 and 177 may be mounted and rotated in mesh to check pitch diameter and runout.

FIG. 22 shows an arrangement wherein a ball bearing 178 is gripped by its inner race 179 on conical mandrels 180 on one of the shanks 135 so that its outer race 181 may be rotating in contact with a sensing roller 182 journaled on a mandrel 183 on the other shank 135 to check outer face runout of the ball bearing.

FIG. 23 shows the shanks 135 provided with long slim finger extensions 184 having work contacting tips 185 adapted to measure very small bores 186 of a workpiece 187.

FIG. 24 shows extension fingers 188 having work contacting surfaces 189 for measuring large outside diameters of workpieces.

FIG. 25 shows extension fingers 190 having sensing tips 191 adapted to engage between internal gear teeth or splines 192 of a workpiece 193.

FIG. 26 shows an arrangement in which a conical mandrel 194 and clamp mechanism 195 secure the outer race 196 rigidly to one of the shanks 135 while a sensing control roller 197 carried on a supporting mandrel 198 on the extension 199 of the other shank 135 is utilized to check the ball bearing inner race 200 for runout.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A high precision caliper gauge comprising in combination:

(A) a straight parallel sided body having an I-shaped cross section for maximum moment of inertia per unit mass in the direction of gauge loading, (B) a jaw fixed to said body with a contacting face at right angles to said body with an I-shaped cross section bending into the body I-section for maximum moment of inertia per unit mass, (C) a movable jaw having an integral portion movable on said body to relatively position said jaws to each other including a section for encompassing and engaging with two basic inner faces a side of said body and three other faces engaging an adjacent side with two opposing faces and a gib with two faces opposing the first two faces, (D) a dial indicator carriage on said body and movable on said body relative to said movable jaw portion having two inner faces engaging with said body opposed by a spring force to enable movement maintaining constant contact with said body with adjacent internal side faces maintaining a lesser contact with said body, (E) means for clamping and releasing said dial indicator carriage on said body comprising a carriage lock member having a toggle joint clamping action and a U-shaped member transmitting the force from a spring transmitted into a carriage lock member with two internal faces in the same plane transferring said force to one side of said parallel sided body with opposing force being transferred to the opposite side by a U-shaped member with an internal surface adjacent to the two sides so that the clamping force extends on the opposite side of the parallel sided body and is located between said other points, (F) means providing limited positive movement between said dial indicator carriage and said movable jaw shank including thumb screw adjustment with a carriage lock member being connected to the dial indicator carriage and a threaded thumb screw providing positive adjustment between said dial indicator obscured in the dial indicator carriage and the movable jaw, (G) a dial indicator fixed in said dial indicator carriage having an actuating plunger, (H) and means connected between said movable jaw and said dial indicator actuating plunger so that relative movement of said movable jaw and said dial indicator carriage operates said dial gauge comprising a spring tube slidably mounted in a hole in said carriage and retained to said carriage with a thumb screw providing easy adjustment with two equal force compression spring retained with an internal snap ring at each end and a U-shaped member attached to said movable jaw and entering the tube through a slot lengthwise in the wall of the tube engaging the near end of each spring to enable force to be transferred without blocking the centermost portion of said tube.

2. In a high precision caliper gauge as set forth in claim 1 wherein said means connected between said movable jaw and said dial indicator plunger includes a dial indicator push rod so located within said tube as to transfer motion of said jaw at the same centerline as the force is exerted.

3. In a high precision caliper gauge as set forth in claim 1 wherein there is provided:

(I) an optical positioning device comprising a slidable optical scale on said body including an adjustable thumb nut mounted within a recess with a spring washer taking up all slack to provide zero backlash and positive positioning assured with screw attached to one end of said scale mounted with zero force along the length of said scale by supporting said scale in a longitudinal slot formed in said body to retain and transfer even heat throughout the length of said scale while said parallel sided body acts as a heat sink to insure against localized temperature rise and inaccuracies in the readings from said scale, (J) an optical magnifier for viewing said scale arranged on said carriage to provide microscopic magnification with a highly corrected monochromatic lens and transparent vernier reticule retained in the same mounting on the same optical center line, (K) and an optical illuminator comprising a fluorescent plastic piece including a light-emitting surface encompassing the area to be viewed with the light entering the plastic through a large area at one end concentrated by the inherent quantity of the plastic material of emission and the cut of the emitting surface to provide illumination as close as possible to and with maximum light being emitted to the image as the light is diffused at the emitting surface.

4. In a high precision caliper gauge as set forth in claim 1 wherein means are provided for attaching a measuring element to a jaw of said gauge including two laterally spaced parallel basic surfaces on each of said jaws, two laterally spaced surfaces at right angles to said first two mentioned surfaces and at substantially the same distance apart, two surfaces directly opposite said second mentioned two surfaces the same distance apart, a single surface for clamping in attachment location directly opposite and between said first two mentioned surfaces, and a single surface at right angles to the first two surfaces and the second two surfaces and the third two surfaces being brought into reference with a round pin or set screw acting as a stop.

References Cited by the Examiner

UNITED STATES PATENTS

| | | | |
|---|---|---|---|
| 2,447,612 | 8/1948 | Dowe | 33—147 |
| 2,524,256 | 10/1950 | Greany | 33—178 |
| 2,529,931 | 11/1950 | Gallup | 33—147 |
| 2,651,235 | 9/1953 | Barrows | 33—143 X |
| 2,775,687 | 12/1956 | Cushman | 240—2.1 |
| 2,879,600 | 3/1959 | Sorensen | 33—147 |
| 3,060,584 | 10/1962 | Westfall | 33—143 |
| 3,126,638 | 3/1964 | Wickert et al. | 33—143 |

FOREIGN PATENTS

| | | |
|---|---|---|
| 632,671 | 11/1949 | Great Britain. |

LEONARD FORMAN, *Primary Examiner.*

S. S. MATTHEWS, *Assistant Examiner.*